United States Patent
Bang

(10) Patent No.: US 9,507,946 B2
(45) Date of Patent: Nov. 29, 2016

(54) PROGRAM VULNERABILITY IDENTIFICATION

(71) Applicant: Bank of America Corporation, Charlotte, NC (US)

(72) Inventor: Mahesh Bang, Telangana (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 14/680,247

(22) Filed: Apr. 7, 2015

(65) Prior Publication Data

US 2016/0300065 A1    Oct. 13, 2016

(51) Int. Cl.
  *G06F 12/14*    (2006.01)
  *G06F 21/57*    (2013.01)
  *G06F 21/52*    (2013.01)

(52) U.S. Cl.
  CPC ............ *G06F 21/577* (2013.01); *G06F 21/52* (2013.01)

(58) Field of Classification Search
  None
  See application file for complete search history.

(56) References Cited

U.S. PATENT DOCUMENTS

| | | | |
|---|---|---|---|
| 8,407,800 B2 | 3/2013 | Schloegel et al. | |
| 8,528,094 B1 | 9/2013 | La Grenade et al. | |
| 8,590,047 B2 | 11/2013 | Hoyt et al. | |
| 8,689,336 B2 | 4/2014 | Brock et al. | |
| 8,819,442 B1 | 8/2014 | Gehrig et al. | |
| 2005/0008001 A1* | 1/2005 | Williams | H04L 12/2602 370/352 |
| 2005/0193430 A1* | 9/2005 | Cohen | H04L 63/1433 726/25 |
| 2007/0067848 A1 | 3/2007 | Gustave et al. | |
| 2011/0093955 A1 | 4/2011 | Chen et al. | |
| 2011/0191854 A1 | 8/2011 | Giakouminakis et al. | |
| 2012/0203590 A1 | 8/2012 | Deb et al. | |
| 2013/0074188 A1 | 3/2013 | Giakouminakis et al. | |
| 2013/0086689 A1 | 4/2013 | Laverdiere-Papineau | |
| 2013/0227695 A1 | 8/2013 | Shankar | |
| 2013/0247206 A1* | 9/2013 | Hugard, IV | G06F 21/577 726/25 |
| 2014/0366140 A1 | 12/2014 | Chen et al. | |

* cited by examiner

*Primary Examiner* — Brandon Hoffman
(74) *Attorney, Agent, or Firm* — Michael A. Springs

(57) ABSTRACT

In one embodiment, a system for identifying and tracking application vulnerabilities includes an interface, a processor, and a memory. The interface is operable to receive a plurality of applications from one or more business units, each of the plurality of applications including source code. A process is communicatively coupled to the interface and is operable to identify a vulnerability associated with the source code of each of the plurality of applications. A memory is communicatively coupled to the interface and the processor and operable to store the vulnerability and the source code associated with the vulnerability in a vulnerability database. The processor is further operable to create a vulnerability tag for the vulnerability stored in the vulnerability database. The memory may also store the vulnerability tag for the vulnerability in a reporting database.

20 Claims, 4 Drawing Sheets

200 — Analyzer

Data From Reporting Database For Active Applications

Top Active Vulnerability Summary

| Category | Rating | Applications | Vulnerability Count | Avg Open Days | Oldest Open Days |
|---|---|---|---|---|---|
| Cross-Site Scripting | High | 12 | 48 | 40 | 47 |
| SQL Injection | High | 50 | 46 | 47 | 50 |
| Password Manage... | High | 6 | 35 | 33 | 38 |
| Privacy Violation | High | 19 | 39 | 19 | 47 |
| Header Manipulation | High | 49 | 42 | 17 | 49 |
| Access Control | High | 17 | 33 | 20 | 48 |
| Denial of Service | High | 3 | 23 | 18 | 35 |

210

Remediation Summary

| Month-Year | Vulnerabilities Added | Vulnerabilities Remediated | Net Active Vulnerabilities |
|---|---|---|---|
| 2014-7 | 45 | 31 | 50 |
| 2014-6 | 20 | 19 | 48 |
| 2014-5 | 39 | 41 | 47 |
| 2014-4 | 47 | 42 | 49 |
| 2014-3 | 35 | 41 | 42 |

220

Active Vulnerability Summary By Rating

| Rating | Applications | Vulnerability Count | Avg Open Days | Oldest Open Days |
|---|---|---|---|---|
| High | 35 | 41 | 30 | 47 |
| Medium | 42 | 49 | 42 | 50 |

PROGRAM VULNERABILITY IDENTIFICATION

TECHNICAL FIELD

This disclosure relates generally to program analysis and, more specifically, to program vulnerability identification.

BACKGROUND

Each day enterprises depend on a myriad of applications to run their critical business infrastructure. The source code of these applications may contain vulnerabilities that affect the operations of the enterprise. Furthermore, an enterprise may rely on third parties to develop some or all of their applications. Overtime, applications are updated and revised to implement new functionality and correct past vulnerabilities. Enterprises spend significant resources monitoring applications and their vulnerabilities.

SUMMARY OF THE DISCLOSURE

In accordance with the present disclosure, in one embodiment, a system for identifying and tracking application vulnerabilities includes an interface, a processor, and a memory. The interface is operable to receive a plurality of applications from one or more business units, each of the plurality of applications including source code. A process is communicatively coupled to the interface and is operable to identify a vulnerability associated with the source code of each of the plurality of applications. A memory is communicatively coupled to the interface and the processor and operable to store the vulnerability and the source code associated with the vulnerability in a vulnerability database. The processor is further operable to create a vulnerability tag for the vulnerability. The memory may store the vulnerability tag in a reporting database.

In another embodiment, a method for identifying and tracking application vulnerabilities includes identifying, using a processor, a vulnerability stored in a vulnerability database, the vulnerability associated with one or more applications. The processor may then create a vulnerability tag for the vulnerability and store the vulnerability tag in a reporting database. The processor may then generate a vulnerability report based on the vulnerability tag stored in the reporting database.

Certain embodiments of the present disclosure may provide one or more technical advantages. One advantage of the present disclosure is the creation of a robust risk prediction model that facilitates the identification and remediation of application vulnerabilities. Another advantage allows for a more efficient tracking and synchronization of application vulnerabilities, resulting in reduced processing requirements for application scanning and vulnerability reporting. Still another advantage is the ability to increase the application vulnerabilities remediated using vulnerability age identification and prediction. One or more other technical advantages may be readily apparent to one skilled in the art from the figures, descriptions, and claims, included herein.

BRIEF DESCRIPTION OF THE DRAWINGS

For a more complete understanding of the present disclosure and for further features and advantages thereof, reference is now made to the following description taken in conjunction with the accompanying drawings, in which:

FIG. 2 is a screenshot illustrating an embodiment of a vulnerability report including charted data;

DETAILED DESCRIPTION

Figure 1:
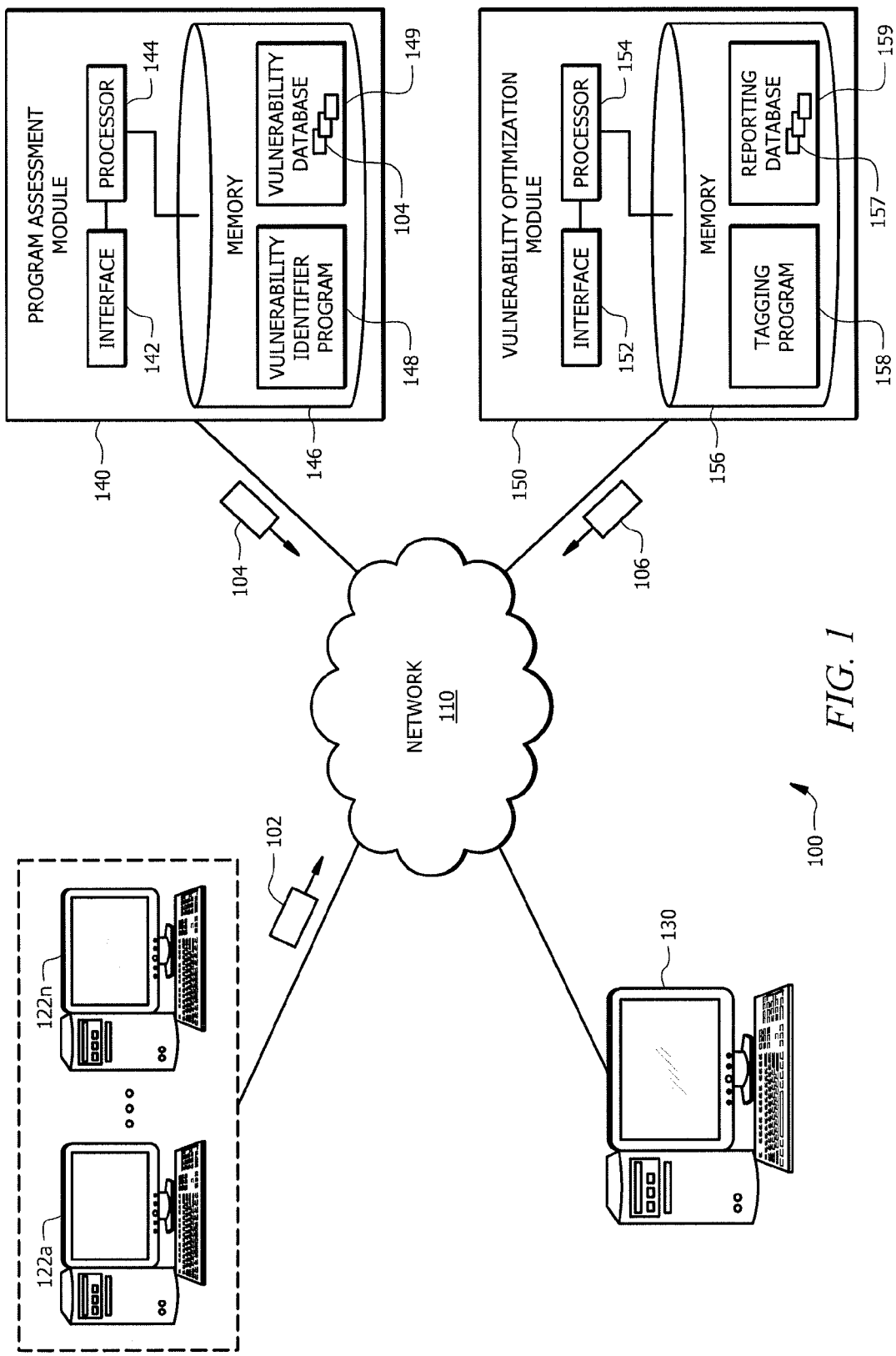
FIG. 1 is an example system for analyzing and tracking program vulnerabilities.

Embodiments of the present disclosure and its advantages are best understood by referring to FIGS. 1-4, like numerals being used for like and corresponding parts of the various drawings.

Each day enterprises depend on a myriad of applications to run their critical business infrastructure. The source code of these applications may contain vulnerabilities that affect the operations of the enterprise. Furthermore, an enterprise may rely on third parties to develop some or all of their applications. Overtime, applications are updated to implement new functionality and correct past vulnerabilities. Enterprises spend significant resources monitoring applications and their vulnerabilities.

It is advantageous to provide a system and method that analyze and track application vulnerabilities. For example, one or more business units in an enterprise may send the applications they utilize to a program assessment module for a vulnerability review. Business units may repeat this review process at regular intervals (e.g., every month, forty-five days, six months). The program assessment module may analyze the application to determine whether the application's source code contains any vulnerabilities. Discovered vulnerabilities may be stored in a vulnerability database to later be analyzed by specialists. The specialists may determine if the program assessment module properly identified a vulnerability (i.e., remove false positives from the vulnerability database). Depending on the size of the enterprise, the number of business units, and the number of applications, the vulnerability database may include tens of thousands of vulnerabilities.

To identify and track the vulnerabilities, a vulnerability optimization module may interface with the vulnerability database. The vulnerability optimization module may tag each vulnerability with information including the vulnerability's name, the application (and version) containing the vulnerability, the business unit running the application, the date that the vulnerability was discovered and tagged, and a review status indicating the severity of the vulnerability. The vulnerability optimization module may synchronize with the vulnerability database at regular intervals (e.g., every twenty-four hours, once a week, once a month) to determine whether any new vulnerabilities have been added to the vulnerability database. To prevent redundancies in the reporting database, vulnerability optimization module may use the tagging function to determine whether a vulnerability added to the vulnerability database is a pre-existing vulnerability discovered during a previous scan, or whether a new version of an application still contains the same vulnerability. In this manner, the tagging program can differentiate between vulnerabilities that have not been corrected and vulnerabilities that may have been missed during an application update. Accordingly, the vulnerability optimization module may provide analytics regarding the applications run by the enterprise's business units.

FIG. 1 is an example system 100 for analyzing and tracking program vulnerabilities. System 100 includes network 110, which facilitates communication between one or more business units 122a-n, workstation 130, program assessment module 140, and vulnerability optimization module 150.

In the illustrated embodiment, business units 122a-n send a plurality of applications 102 to program assessment module 140 to be analyzed for vulnerabilities. Program assessment module 140 may identify vulnerabilities in the plurality of applications 102 and store identified vulnerabilities 104 in vulnerability database 149. Program assessment module 140 may send identified vulnerabilities 104 to workstation 130 for a specialist to analyze. Utilizing workstation 130, the specialist may analyze the source code pertaining to identified vulnerabilities 104. The specialist may determine that identified vulnerability 104 is a false-positive and indicate to program assessment module 140 that the identified vulnerability 104 should be removed from vulnerability database 149. Alternatively, the specialist may confirm identified vulnerability 104 and indicate to program assessment module 140 that the vulnerability needs remediation.

Vulnerability optimization module 150 may then analyze and tag identified vulnerabilities 104 in vulnerability database 149. Vulnerability optimization module 150 may then store tagged vulnerabilities 157 in reporting database 159. Reporting database 159 may then develop analytics and track identified vulnerabilities 104 in vulnerability database 149. For example, vulnerability optimization module 150 may generate and transmit vulnerability report 106 to business units 122a-n based on tagged vulnerabilities 157. Vulnerability report 106 may be customized to include specific information regarding identified vulnerabilities 104 affecting the applications administered by individual business units (e.g., business unit 122a), or it may be generalized to produce information regarding identified vulnerabilities 104 affecting the entire enterprise.

Network 110 represents any suitable network operable to facilitate communication between the components of system 100. Network 110 may include any interconnecting system capable of transmitting audio, video, signals, data, messages, or any combination of the preceding. Network 110 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof operable to facilitate communication between the components.

Business units 122a-n represent any number of departments or divisions in an enterprise including compliance, consumer banking, corporate audit, corporate security, commercial banking, corporate banking, markets, human resources, marketing, technology, investment management, mortgage, or legal. In certain embodiments, business units 122a-n may be associated with the same enterprise, such as a particular financial institution, or with multiple enterprises, such as other financial institutions, data bureaus, and/or third party vendors.

Business units 122a-n may utilize one or more applications to conduct their operations. To ensure that the applications are designed and functioning properly, business units 122a-n may use program assessment module 140 to scan their applications for potential vulnerabilities. For example, an enterprise may require business unit 122a to scan every application and every new version of the application used by business unit 122a. Business unit 122a may scan their active applications periodically (i.e., every month, forty-five days, six months, year) to take advantage of any updates to vulnerability identifier program 148.

Workstation 130 enables one or more specialists to monitor, administer, or otherwise interact with program assessment module 140 and vulnerability optimization module 150. Workstation 130 may include one or more laptops, personal computers, monitors, display devices, handheld devices, smartphones, servers, user input devices, or other suitable components for enabling user input. Workstation 130 may itself include program assessment module 140 and vulnerability optimization module 150. Workstation 130 may be part of business unit 122a or could remotely access business unit 122a.

Workstation 130 may be used to review vulnerabilities identified by program assessment module 140. For example, a specialist may determine that identified vulnerability 104 is a false-positive and indicate to program assessment module 140 that the vulnerability should be removed from vulnerability database 149. In certain embodiments, tagging program 158 may associate, or tag, a vulnerability with a specific specialist, indicating that the specialist is designated to monitor and/or fix the vulnerability. Tagging program 158 may include the IP address of workstation 130 so that the specialist receives updates and vulnerability reports 106 regarding vulnerabilities tagged with that specialist.

Program assessment module 140 and vulnerability optimization module 150 represent any suitable components that facilitate identifying and tracking application vulnerabilities. Program assessment module 140 and vulnerability optimization module 150 may also be any suitable components that generate and facilitate the identification, tagging, and reporting of application vulnerabilities and their remediation. Program assessment module 140 and vulnerability optimization module 150 may include a network server, remote server, mainframe, host computer, workstation, web server, personal computer, file server, or any other suitable device operable to communicate with other devices and process data. In some embodiments, program assessment module 140 and vulnerability optimization module 150 may execute any suitable operating system such as IBM's zSeries/Operating System (z/OS), MS-DOS, PC-DOS, MAC-OS, WINDOWS, UNIX, OpenVMS, Linux, or any other appropriate operating systems, including future operating systems.

The functions of program assessment module 140 and vulnerability optimization module 150 may be performed by any suitable combination of one or more servers or other components at one or more locations. In the embodiment where the modules are servers, the servers may be public or private servers, and each server may be a virtual or physical server. The server may include one or more servers at the same or at remote locations. Program assessment module 140 and vulnerability optimization module 150 may also include any suitable component that functions as a server. In some embodiments, workstation 130 may be integrated with program assessment module 140 and vulnerability optimization module 150 or they may operate as part of the same device or devices.

In the illustrated embodiment, program assessment module 140 includes an interface 142, a processor 144, and a memory 146, which comprises vulnerability identifier program 148 and vulnerability database 149.

Program assessment interface 142 may be used to receive a plurality of applications 102 from one or more business units 122a-n. Program assessment interface 142 may also transmit the source code of identified vulnerabilities 104 to workstation 130 so that a specialist may further inspect the source code to determine if there is any malicious code. In certain embodiments, program assessment interface 142 may aid vulnerability optimization interface 152 in searching vulnerability database 149. For example, in certain embodiments, program assessment interface 142 may send a notification to vulnerability optimization module 150 that a new vulnerability was identified and needs to be tagged by vulnerability optimization module 150.

Program assessment processor 144 communicatively couples interface 142 and memory 146 and controls the operation of program assessment module 140. Program assessment processor 144 includes any hardware and software that operate to control and process information. For example, program assessment processor 144 may execute vulnerability identifier program 148 to analyze the plurality of applications 102 sent from business units 122a-n to identify vulnerabilities. Vulnerability identifier program 148 facilitates analyzing, by program assessment processor 144, the static source code of the plurality of applications 102 for a number of vulnerabilities including but not limited to: cross-site scripting, SQL injection, privacy violations, header manipulation, access control, denial of service, path manipulation, open source code, and password management. Program assessment processor 144 may also execute vulnerability identifier program 148 to analyze different types of code in a number of different programming and mark-up languages including: JAVA, C, C++, C#, Python, JAVA Script, PHP, Ruby, SQL, HTML, Perl, and Matlab. Once program assessment processor 144 identifies a potential vulnerability, the vulnerability and the associated source code may be stored in vulnerability database 149.

Once program assessment processor 144 identifies a potential vulnerability, it may store the vulnerability and the associated source code in vulnerability database 149. Vulnerability database 149 represents any database, system, or computer that is capable of storing and allowing access to information regarding application vulnerabilities. Vulnerability database 149 may store thousands of vulnerabilities and the associated source code. In certain embodiments, vulnerability identifier program 148 may utilize known vulnerabilities stored in vulnerability database 149 to compare against the applications received from business units 122a-n.

In the illustrated embodiment vulnerability optimization module 150 includes interface 152, processor 154, and memory 156, which comprises tagging program 158 and reporting database 159.

Vulnerability optimization interface 152 may interact with program assessment module 140 to access vulnerability database 149 and scan identified vulnerabilities 104. Vulnerability optimization interface 152 may also transmit vulnerability reports 106 and prediction models to one or more business units 122a-n. Vulnerability optimization interface 152 may also facilitate communications with specialists using workstation 130 to indicate which identified vulnerabilities 104 in vulnerability database 149 have the highest priority as indicated by tagging program 158.

Vulnerability optimization processor 154 communicatively couples interface 152 and memory 156 and controls the operation of vulnerability optimization module 150. Vulnerability optimization processor 154 may execute tagging program 158 to analyze identified vulnerabilities 104 stored in vulnerability database 149. Tagging program 158 may scan identified vulnerabilities 104, generate a tagged vulnerability 157 based on the identified vulnerability 104, and store tagged vulnerability 157 in reporting database 159. In certain embodiments, tagged vulnerability 157 comprises a plurality of information regarding identified vulnerability 104 that is useful to the tracking and remediation of identified vulnerability 104.

In an example embodiment, vulnerability optimization processor 154 executes tagging program 158 and scans vulnerability database 149 to create a tagged vulnerability 157 for each identified vulnerability 104. A tagged vulnerability 157 may comprise information including, but is not limited to, a vulnerability identifier, an application identifier, a review version, a status date, an implementation date, a review status, a remediation date, vendor identifier, and a business group identifier. Tagging program 158 may tag vulnerabilities stored in vulnerability database 149 using one or more of the foregoing categories when used by vulnerability optimization processor 154. Vulnerability optimization processor 154 may store tagged vulnerabilities 157 in vulnerability database 156.

A vulnerability identifier identifies the type of vulnerability found in the source code. For example, program assessment module 140 may scan a data-driven application and determine that the application contains malicious SQL statements in the form of an SQL injection. Vulnerability identifier may name the vulnerability "SQL Injection."

An application identifier of the vulnerability identifies the application containing the vulnerability. The tag may identify the application by a program title or by any other naming convention that an enterprise may use to track applications across business units 122a-n.

A review version of the vulnerability identifies the version of the application containing the vulnerability. For example, business unit 122a may be running version 2.1.3 of an application. By tagging the review version of the vulnerability, vulnerability optimization module 150 may track the security of an application over multiple revisions. Vulnerability optimization module 150 may also determine in which version of an application a vulnerability was remediated. The review version tag may be used in tandem with other tags to prioritize which vulnerabilities should be addressed in subsequent versions.

The status date of a vulnerability indicates the date that the vulnerability was first tagged. This tag may provide useful information on how quickly a vulnerability is remediated, the average time different vulnerabilities take to be remediated, and may be used to set goals to have vulnerabilities corrected within a certain period from the status date. In certain embodiments, vulnerability optimization module 150 may determine which business units 122a-n utilize an application containing a vulnerability and send an alert to managers of those business units 122a-n. In certain embodiments the alert may be generated when the vulnerability has a status date greater than a certain period of time (e.g., six months, one year, eighteen months).

An implementation date of the vulnerability is the date that the application containing the vulnerability was first used by business unit 122a. This metric may be used to determine how much time elapses from the date an application containing the vulnerability is implemented until the date the vulnerability is identified.

A review status of a vulnerability assigns a rating to the vulnerability based on the severity of the vulnerability. For example, the tag may assign a review status of high, medium, or low to each vulnerability taking factors such as the importance of the application, the severity of the vulnerability, and the number business units 122a-n utilizing the application. Any suitable indicator may be used for the review status, such as a number ranking (e.g., 10 is critical and 1 is low-importance).

A remediation date of a vulnerability indicates the date that the vulnerability was corrected in an application. For example, a vulnerability may be present in versions 2.2.1 through 2.3.5 of an application. This may correspond to a time period of three years. Using this tag, vulnerability optimization module 150 may be able to predict how long certain types of vulnerabilities will take to correct by looking at historic remediation dates.

A vendor identifier of a vulnerability may identify the vendor or third-party who developed and/or is responsible for maintaining the application containing the vulnerability. This tag may aid business unit 122a in determining who to purchase or license an application from based on the quality of the vendor's previous applications. For example, a business unit may choose to go with vendor #1 over vendor #2 based on a report from vulnerability optimization module 150 indicating that the applications from vendor #2 contain more vulnerabilities and take longer to remediate.

A business group identifier of a vulnerability may identify business units 122a-n utilizing the application containing the vulnerability. The business group identifier may also include the manager of each business unit and contact information. For example, vulnerability optimization module 150 may determine which business units are using an application having a vulnerability with a status date more than one year old. Vulnerability optimization module 150 may then send an alert (e.g., an email, automated phone message, SMS message) to each manager of the affected business units 122a-n.

By storing each vulnerability tag in reporting database 159, vulnerability optimization processor 154 may improve the efficiency of program assessment module 140 and vulnerability optimization module 150.

For example, tagged vulnerabilities 157 may reduce redundancies in system 100. Before storing a new tagged vulnerability 157 in reporting database 159, vulnerability optimization processor 154 may first scan reporting database 159 to determine whether there is already a tagged vulnerability 157 having the same vulnerability identifier, application identifier, and review version. Redundancies in vulnerability database 149 may occur due to the application reporting requirements of business unit 122a. For instance, business unit 122a may use program assessment module 140 to scan their active applications every three months regardless of whether the application has been updated. This may lead to program assessment module 140 identifying the same vulnerability each time the application is scanned. Vulnerability optimization processor 154 may use tagged vulnerability 157 associated with the identified vulnerability 104 to recognize the redundancy and prevent tag vulnerability 157 from being stored in reporting database 159. In certain embodiments, vulnerability optimization processor 154 may also interact with vulnerability database 149 to remove the redundant identified vulnerability 104 discovered during the application scanning process. This redundancy prevention system may provide significant optimization of memory leading to cost savings for the enterprise.

In certain embodiments, vulnerability optimization processor 154 may also generate application-specific, trend reports using vulnerability tags stored in reporting database 159. For example, vulnerability optimization processor 154 may create an application trend profile by using tagged vulnerabilities 157 having the same application identifier and review version. Vulnerability optimization processor 154 may organize and track identified vulnerabilities 104 contained in a specific application across multiple revisions. Vulnerability optimization processor 154 may determine how quickly identified vulnerabilities 104 are remediated and how many of the remaining identified vulnerabilities 104 are listed by the review status as "high" or "critical."

In certain embodiments, vulnerability optimization processor 154 may utilize tagging program 158 to generate vulnerability report 106 based on the vulnerability tags stored in reporting database 159. Vulnerability report 106 may take on a number of forms depending on the type of data included and the audience the report is sent to. For example, vulnerability report 106 may be generated for a manager of business unit 122a. Vulnerability optimization processor 154 may tailor vulnerability report 106 just to include information for the applications used by business unit 122a. In another embodiment, vulnerability report 106 may be sent to a specialist at workstation 130 and include information on vulnerabilities assigned to the specialist to remediate. In certain embodiments, vulnerability report 106 may be automated to send a report at designated times (e.g., every month, every quarter, once a week), or upon the occurrence of certain events such as the number of vulnerabilities in an application exceeding a certain number, or a certain vulnerability has a status date older than a certain time period, or an application includes a vulnerability having a high rating. Furthermore, vulnerability report 106 may present information regarding tagged vulnerabilities 157 in a number of formats. For example, and not by way of limitation, vulnerability report 106 may organize tagged vulnerabilities 157 in a spreadsheet (see the discussion of FIG. 2 below) and in one or more charts (see the discussion of FIG. 3 below).

A component of system 100 may include an interface, logic, memory, and other suitable elements. An interface receives input, sends output processes the input and/or output, and performs other suitable operations. An interface may comprise hardware and software. Logic performs the operation of the component. For example, logic executes instructions to generate output from input. Logic may include hardware, software and other logic. Logic may be encoded in one or more non-transitory, tangible media, such as a computer readable medium or any other suitable tangible medium, and may perform operations when executed by a computer. Certain logic, such as a processor, may manage the operation of a component. Examples of a processor include one or more computers, one or more microprocessors, one or more applications, and other logic.

As used herein, an interface represents any suitable device operable to receive information from network 110, transmit information through network 110, perform suitable processing of the information, communicate to other devices, or any combination thereof. An interface may represent any port or connection, real or virtual, including any suitable hardware and/or software, including protocol conversion and data processing capabilities, to communicate through a LAN, WAN, or other communication system that allows an interface to exchange information with network 110, business units 122a-n, workstation 130, program assessment module 140, vulnerability optimization module 150, or any other components of system 100.

As used herein, a memory stores, either permanently, or temporarily, data, operational software, other information for a processor or other components of system 100. A memory may include any one or a combination of volatile or nonvolatile local or remote devices suitable for storing information. For example, a memory may include RAM, ROM, flash memory, magnetic storage devices, optical storage devices, network storage devices, cloud storage devices, solid state devices, or any other suitable information storage device or a combination of these devices. A memory may store information in one or more databases, file systems, tree structures, any other suitable storage system, or any combination thereof. Furthermore, different information stored in a memory may use any of these storage systems (e.g., vulnerability database 149, and reporting database 159 may be stored in a relational database). Moreover, any information stored in a memory may be encrypted or unencrypted, compressed or uncompressed, and static or editable. Although illustrated as including particular modules, a memory may include any suitable information for use in the operation of program assessment module 140 and vulnerability optimization module 150.

Modifications, additions, or omissions may be made to system 100 without departing from the scope of the disclosure. For example, vulnerability optimization module 150 may perform an incremental daily sync operation to improve the performance of system 100. The incremental daily sync operation may provide for more efficient tracking of application vulnerabilities by only searching vulnerability database 149 for vulnerabilities added in the last twenty-four hours. This syncing process prevents vulnerability optimization module 150 from tagging and retagging every vulnerability stored in vulnerability database 149. Vulnerability optimization module 150 may instead focus on only the new vulnerabilities identified by program assessment module 140. Vulnerability optimization module 150 may also perform a self-correction process to ensure the validity of reporting database 159. For example, vulnerability optimization module 150 may run a self-correction procedure to ensure that vulnerability optimization module 150 properly syncs with vulnerability database 149 at proper intervals to create new vulnerability tags. In certain embodiments, program assessment module 140 and vulnerability optimization module 150 may be integrated and vulnerability identifier program 148 and tagging program 158 may be combined into a single program and vulnerability database 149 and reporting database 159 may be combined into a single database. Any suitable logic may perform the functions of system 100 and the components within system 100.

FIG. 2 is a screenshot 200 illustrating an embodiment of a vulnerability report 106 including charted data. Screenshot 200 includes top active vulnerability summary 210, remediation summary 220, and vulnerability rating summary 230. Top active vulnerability summary 210 includes several columns of information including the vulnerability identifier, review status (rating), the number of applications containing the vulnerability, the total number of times the vulnerability appears in the applications, the average number of days the vulnerability is active for, and the oldest active occurrence of the vulnerability. For example, the vulnerability "Cross-Site Scripting" has a review status of high, there are 12 applications containing this vulnerability, this vulnerability appears 48 times in the 12 applications, the average number of days that the vulnerability is active in an application is 40, and the oldest active occurrence of the vulnerability is 47 days.

Remediation summary 220 includes data that highlights the number of vulnerabilities added, remedied, and the net active vulnerabilities remaining for each month. For example, the time-period "2014-7" had 45 vulnerabilities added, 31 vulnerabilities remediated, and 50 net vulnerabilities active. Using this data, a user may see the month-to-month progression of the number of vulnerabilities affecting applications for a given business unit 122a or enterprise.

Vulnerability rating summary 230 includes data describing vulnerabilities having a review status of "High" or "Medium." In some embodiments, business unit 122a may only want to know if there are any critical vulnerabilities active in their applications. Other business units may want to know all vulnerabilities that are active in their applications. In the illustrated embodiment, vulnerability rating summary 230 shows that there are 35 applications that have a vulnerability with a "high" review status. There are 41 instances of vulnerabilities with a "high" review status in the 35 applications. The average number of active open days of vulnerability having a "high status" is 30, with the oldest active vulnerability being active for 47 days.

Modifications, additions, or omissions may be made to screenshot 200 of vulnerability report 106 without departing from the scope of the disclosure. Screenshot 200 may include a number of other tables. For example, screenshot 200 may include a table breaking down identified vulnerabilities 104 by vendor. In certain embodiments, screenshot 200 may include an application specific summary that shows identified vulnerabilities 104 across multiple revisions of the same application. Furthermore, tagged vulnerabilities 157 may be displayed in a number of other formats. In certain embodiments, vulnerability report 106 may display the source code containing tagged vulnerability 157.

Figure 3:
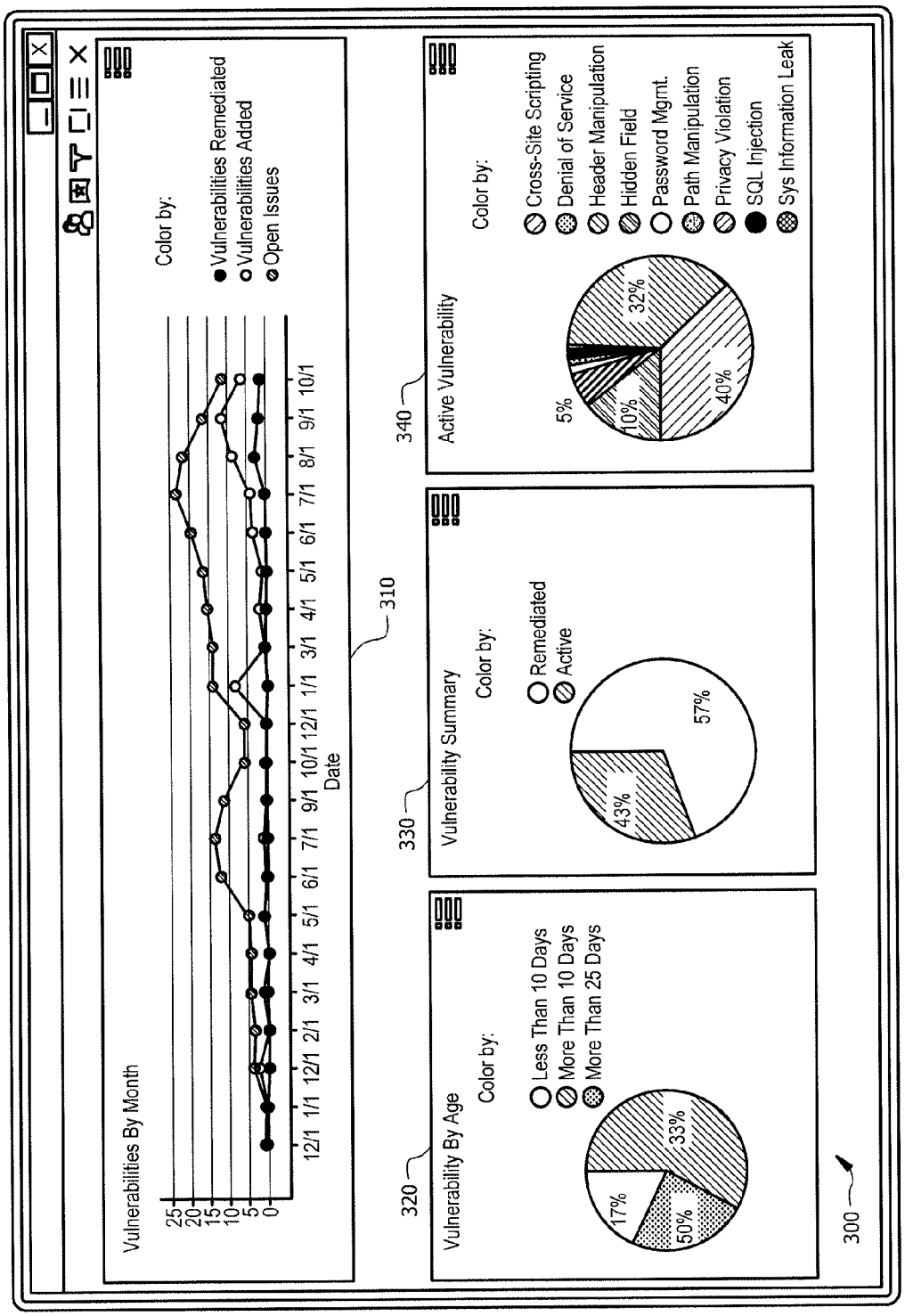
FIG. 3 is a screenshot illustrating an embodiment of a vulnerability report including trending visualizations.

FIG. 3 is a screenshot 300 illustrating an embodiment of a vulnerability report 106 including trending visualizations. In the illustrated embodiment, line-graph visualization 310 displays the number of vulnerabilities found each month in the one or more applications running in business unit 122a. Line-graph visualization 310 includes three lines, one for vulnerabilities added, one for vulnerabilities remediated, and one for the total number of open vulnerabilities. The x-axis tracks the date by month, while the y-axis tracks the number of vulnerabilities. Line-graph visualization 310 lets a manager of business unit 122a quickly see how efficiently vulnerabilities in business unit 122a are remediated.

Pie-chart age visualization 320 displays the age of vulnerabilities running in applications of business unit 122a. For example, in the illustrated embodiment, pie-chart age visualization 320 shows that 17% of vulnerabilities affecting applications in business unit 122a are less than 10 days old. Similarly, 50% of the vulnerabilities are more than 25 days old, and 33% of vulnerabilities are more than 10 days old but less than 25 days old. In certain embodiments, a manager of business unit 122a may request further information regarding vulnerabilities that are more than 25 days old from vulnerability optimization module 150.

Pie-chart summary visualization 330 displays the total number remediated and active vulnerabilities still present in the applications running in business unit 122a. In the illustrated embodiment, 57% of vulnerabilities have been remediated, while 43% have been remediated. In some embodiments, business unit 122a may have set goals for the total percentage of active vulnerabilities in their applications and may receive an alert from vulnerability optimization module 150 if the percentage exceeds a certain percentage.

Pie-chart identifier visualization 340 displays the percentage of each type of vulnerability affecting the applications in business unit 122a. Business unit 122a may require that certain vulnerabilities be less than a certain percentage. A manager may utilize pie-chart identifier visualization 340 to keep track of each vulnerability as the vulnerabilities are remediated.

Modifications, additions, or omissions may be made to screenshot 300 of vulnerability report 106 without departing from the scope of the disclosure. Screenshot 300 may include a number of other visualizations of tagged vulnerabilities 157. For example, screenshot 300 may include histograms, scatterplots, time-series graphs, or any other visualization that allows a user to interpret and understand trends in tagged vulnerabilities 157.

Figure 4:
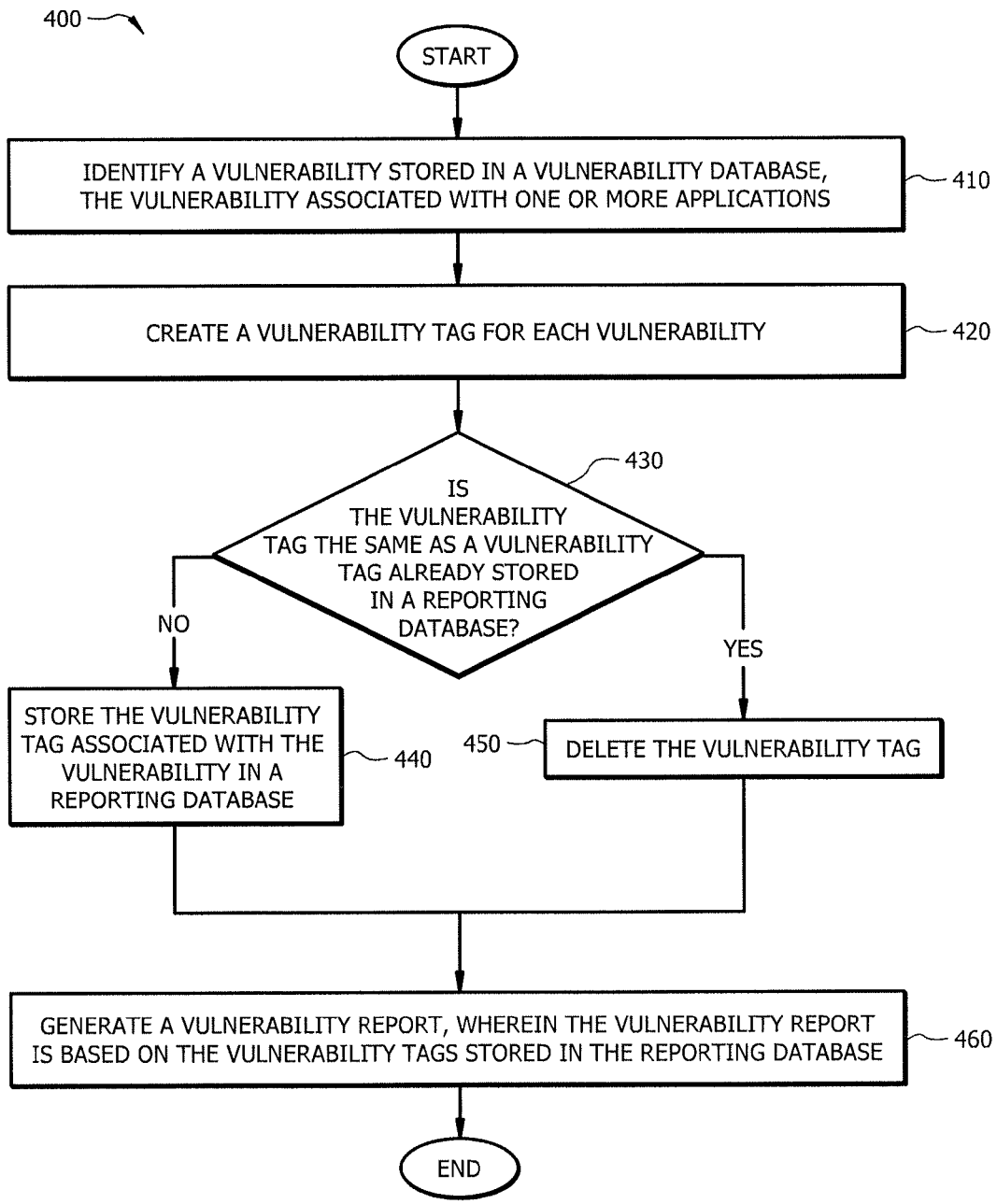
FIG. 4 is a flowchart of a method for analyzing and tracking program vulnerabilities.

FIG. 4 is a flowchart of a method 400 for analyzing and tracking program vulnerabilities. At step 410, vulnerability optimization module 150 identifies a plurality of vulnerabilities stored in vulnerability database 149. The plurality of vulnerabilities are associated with a plurality of applications 102. In certain embodiments, the application source code containing the identified vulnerability is stored in vulnerability database 149.

At step 420, vulnerability optimization module 150 creates a vulnerability tag for each of the identified vulnerabilities. A vulnerability tag may include a vulnerability identifier, an application identifier, a review version, a status date, an implementation date, a review status, a remediation date, vendor identifier, and a business group identifier.

At step 430, vulnerability optimization module 150 performs a redundancy check to determine if reporting database 159 already includes a vulnerability tag having the same information. For example, optimization module 150 may identify a new vulnerability added to vulnerability database 149 and create a vulnerability tag. Before storing the vulnerability tag in reporting database 159, vulnerability optimization processor 154 may first scan reporting database 159 to determine if any other vulnerability tags already have the same vulnerability identifier, application identifier, and review version. If no vulnerability tags already exist in reporting database 159, then the sequence may proceed to step 440. If a vulnerability tag already exists, then the sequence may proceed to step 450.

At step 440, vulnerability optimization module 150 stores the vulnerability tag in reporting database 159. At step 450, vulnerability optimization module 150 deletes the redundant vulnerability tag.

At step 460, vulnerability optimization module 150 generates vulnerability report 106 based on the vulnerability tags stored in reporting database 159. For example, vulnerability report 106 may be generated for a manager of business unit 122a. Vulnerability optimization module 150 may tailor vulnerability report 106 just to include information for the applications used by business unit 122a. In another embodiment, vulnerability report 106 may be sent to a specialist at workstation 130 and include information on vulnerabilities assigned to the specialist. In certain embodiments, vulnerability report 106 may be automated to send a report at designated times or upon the occurrence of certain events.

Various embodiments may perform some, all, or none of the steps described above. For example, in certain embodiments, program assessment module 140 and vulnerability optimization module 150 may be combined to perform each step of method 400 from a single module. Furthermore, certain embodiments may perform these steps in a different order or in parallel. For example, at step 430, vulnerability optimization module may also remove redundant vulnerabilities from vulnerability database 149 in addition to removing redundant tags from reporting database 159. Moreover, one or more steps may be repeated. Although discussed as vulnerability optimization module 150 performing these steps, any suitable component of system 100 may perform one or more steps of the method.

One or more other technical advantages may be readily apparent to one skilled in the art from the figures, descriptions, and claims, included herein. One advantage of the present disclosure is the creation of a robust risk prediction model that facilitates the identification and remediation of application vulnerabilities. Another advantage allows for a more efficient tracking and synchronization of application vulnerabilities, resulting in reduced processing requirements for application scanning and vulnerability reporting. Still another advantage is the ability to increase the application vulnerabilities remediated using vulnerability age identification and prediction. One or more other technical advantages may be readily apparent to one skilled in the art from the figures, descriptions, and claims, included herein.

Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A system for identifying and tracking application vulnerabilities, comprising:
   an interface operable to receive a plurality of applications from one or more business units, each of the plurality of applications comprising source code;
   a processor communicatively coupled to the interface and operable to:
      identify a vulnerability associated with the source code of each of the plurality of applications; and
      identify a vulnerability type;
   the interface further operable to:
      communicate the vulnerability to one of a plurality of specialists for confirmation, the specialist chosen based on, at least in part, the vulnerability type; and
      receive a confirmation that the vulnerability is not a false positive;
   a memory communicatively coupled to the interface and the processor and, after receiving the confirmation, operable to store the vulnerability and the source code associated with the vulnerability in a vulnerability database;
   the processor further operable to create a vulnerability tag for the vulnerability stored in the vulnerability database;
   the memory further operable to store the vulnerability tag for the vulnerability in a reporting database; and
   the interface further operable to communicate an alert, the alert automatically generated when the vulnerability has a status date greater than a predetermined period of time.

2. The system of claim 1, wherein the processor is further operable to generate a vulnerability report based on the vulnerability tag stored in the reporting database.

3. The system of claim 1, wherein a vulnerability tag comprises:
   a vulnerability identifier, the vulnerability identifier identifies a type of vulnerability found in the source code;
   an application identifier, wherein the application identifier identifies an application comprising the vulnerability;
   a review version, wherein the review version identifies a version of the application comprising the vulnerability;
   a status date, wherein the status date is a date that the vulnerability was tagged; and a review status, wherein the review status is a rating assigned to the vulnerability, the review status selected from the group comprising: high, medium, and low.

4. The system of claim 3, wherein the processor is further operable to create an application trend profile, comprising:
create a first group of vulnerability tags having a same application identifier;
categorize the first group of vulnerability tags into subgroups by vulnerability tags having a same review version.

5. The system of claim 3, wherein the processor is further operable to create an application status profile, comprising:
aggregate vulnerability tags having a same application identifier into a first group;
sub-aggregate the vulnerability tags in the first group by review status; and
generate a vulnerability report for the application status profile identifying the vulnerability by review status.

6. The system of claim 3, wherein the processor is further operable to in response to the vulnerability tag having the same vulnerability identifier, application identifier, and review identifier as a vulnerability tag stored in the reporting database, delete the vulnerability tag.

7. The system of claim 3, wherein the vulnerability tag further comprises:
a business group identifier, wherein the business group identifier identifies the one or more business groups utilizing the application containing the vulnerability and one or more managers of the one or more business groups;
the processor is further operable to send an alert to the one or more managers in response to the status date of the vulnerability tag being more than one year old.

8. A method for identifying and tracking application vulnerabilities, the method comprising:
identifying, using a processor, a vulnerability stored in a vulnerability database, the vulnerability associated with one or more applications;
identifying a vulnerability type;
communicating the vulnerability to one of a plurality of specialists for confirmation, the specialist chosen based on, at least in part, the vulnerability type;
receiving a confirmation that the vulnerability is not a false positive;
after receiving the confirmation, creating, using the processor, a vulnerability tag for the vulnerability;
storing, using a memory communicatively coupled to the processor, the vulnerability tag in a reporting database;
generating, using an interface communicatively coupled to the processor, a vulnerability report, wherein the vulnerability report is based on the vulnerability tag stored in the reporting database; and
communicating an alert, the alert automatically generated when the vulnerability has a status date greater than a predetermined period of time.

9. The system of claim 8, wherein a vulnerability tag comprises:
a vulnerability identifier, the vulnerability identifier identifies a type of vulnerability found in the source code;
an application identifier, wherein the application identifier identifies an application comprising the vulnerability;
a review version, wherein the review version identifies a version of the application comprising the vulnerability;
a status date, wherein the status date is a date that the vulnerability was tagged; and a review status, wherein the review status is a rating assigned to the vulnerability, the review status selected from the group comprising: high, medium, and low.

10. The system of claim 9, further comprising:
creating an application trend profile, comprising:
creating a first group of vulnerability tags having a same application identifier;
categorizing the first group of vulnerability tags into subgroups by vulnerability tags having a same review version.

11. The system of claim 9, further comprising:
creating an application status profile, comprising:
aggregating vulnerability tags having a same application identifier into a first group;
sub-aggregating the vulnerability tags in the first group by review status; and
generating a vulnerability report for the application status profile identifying the vulnerability by review status.

12. The system of claim 9, further comprising in response to the vulnerability tag having the same vulnerability identifier, application identifier, and review identifier as a vulnerability tag stored in the reporting database, deleting the vulnerability tag.

13. The system of claim 9, wherein the vulnerability tag further comprises:
a business group identifier, wherein the business group identifier identifies the one or more business groups utilizing the application containing the vulnerability and one or more managers of the one or more business groups.

14. The system of claim 13, further comprising in response to the status date of the vulnerability tag being more than one year old, sending a vulnerability report to the one or more managers.

15. A non-transitory computer readable storage medium comprising logic, the logic operable, when executed by a processor, to:
receive a plurality of applications from one or more business units, each of the plurality of applications comprising source code;
identify a vulnerability associated with the source code of each of the plurality of applications;
identify a vulnerability type;
communicate the vulnerability to one of a plurality of specialists for confirmation, the specialist chosen based on, at least in part, the vulnerability type;
receive a confirmation that the vulnerability is not a false positive;
after receiving the confirmation, store the vulnerability and the source code associated with the vulnerability in a vulnerability database;
create a vulnerability tag for the vulnerability stored in the vulnerability database;
store the vulnerability tag for the vulnerability in a reporting database; and
communicate an alert, the alert automatically generated when the vulnerability has a status date greater than a predetermined period of time.

16. The non-transitory computer readable storage medium of claim 15, wherein the logic is further operable, when executed by a processor, to generate a vulnerability report based on the vulnerability tags stored in the reporting database.

17. The non-transitory computer readable storage medium of claim 15, wherein a vulnerability tag comprises:
a vulnerability identifier, the vulnerability identifier identifies a type of vulnerability found in the source code;

an application identifier, wherein the application identifier identifies an application comprising the vulnerability;

a review version, wherein the review version identifies a version of the application comprising the vulnerability;

a status date, wherein the status date is a date that the vulnerability was tagged; and a review status, wherein the review status is a rating assigned to the vulnerability, the review status selected from the group comprising: high, medium, and low.

18. The non-transitory computer readable storage medium of claim 17, wherein the logic is further operable, when executed by the processor, to in response to the vulnerability tag having the same vulnerability identifier, application identifier, and review identifier as a vulnerability tag stored in the reporting database, delete the vulnerability tag.

19. The non-transitory computer readable storage medium of claim 17, wherein the vulnerability tag further comprises a business group identifier, wherein the business group identifier identifies the one or more business groups utilizing the application containing the vulnerability and one or more managers of the one or more business groups; and the logic is further operable, when executed by the processor, to send an alert to the one or more managers in response to the status date of the vulnerability tag being more than one year old.

20. The non-transitory computer readable storage medium of claim 17, wherein the logic is further operable, when executed by the processor, to create an application status profile, comprising:

aggregate vulnerability tags having a same application identifier into a first group;

sub-aggregate the vulnerability tags in the first group by review status; and generate a vulnerability report for the application status profile identifying the vulnerability by review status.

* * * * *